United States Patent
Illy et al.

(10) Patent No.: US 11,534,022 B2
(45) Date of Patent: Dec. 27, 2022

(54) MACHINE TO DISPENSE COFFEE-BASED BEVERAGES, AND CORRESPONDING DISPENSING METHOD AND PROGRAM

(71) Applicant: ILLYCAFFE' S.P.A., Trieste (IT)

(72) Inventors: Andrea Illy, Trieste (IT); Furio Suggi Liverani, Trieste (IT); Riccardo Piras, Monza (IT); Michele Alessio, Trieste (IT); Eleonora Buligatto, Trieste (IT); Francesco Cescutti, Trieste (IT)

(73) Assignee: ILLYCAFFE' S.P.A., Trieste (IT)

( * ) Notice: Subject to any disclaimer, the term of this patent is extended or adjusted under 35 U.S.C. 154(b) by 397 days.

(21) Appl. No.: 16/766,223

(22) PCT Filed: Nov. 21, 2018

(86) PCT No.: PCT/IT2018/050225
§ 371 (c)(1),
(2) Date: May 21, 2020

(87) PCT Pub. No.: WO2019/102509
PCT Pub. Date: May 31, 2019

(65) Prior Publication Data
US 2020/0367689 A1    Nov. 26, 2020

(30) Foreign Application Priority Data
Nov. 21, 2017  (IT) ................. 102017000133303

(51) Int. Cl.
*A47J 31/52*  (2006.01)
*A47J 31/46*  (2006.01)
*A23F 5/26*   (2006.01)

(52) U.S. Cl.
CPC ............. *A47J 31/5251* (2018.08); *A23F 5/26* (2013.01); *A47J 31/461* (2018.08); *A47J 31/468* (2018.08); *A47J 31/5253* (2018.08); *A47J 31/5255* (2018.08)

(58) Field of Classification Search
CPC .... A47J 31/461; A47J 31/468; A47J 31/5251; A47J 31/5253; A47J 31/5255; A23F 5/26
USPC ....................................................... 426/231
See application file for complete search history.

(56) References Cited

U.S. PATENT DOCUMENTS 9,427,104 B1 *  8/2016  Tacklind .................. A23F 5/26

FOREIGN PATENT DOCUMENTS

| DE | 20 2006 014317 U1 | 2/2008 |
| WO | 2007/110768 A2 | 10/2007 |
| WO | 2015/124627 A1 | 8/2015 |

(Continued)

OTHER PUBLICATIONS

International Search Report and Written Opinion from Application No. PCT/IT2018/050225 dated Mar. 19, 2019 (17 pages).

*Primary Examiner* — Toan C Ly
(74) *Attorney, Agent, or Firm* — Calfee Halter & Griswold LLP

(57) ABSTRACT

Machine to obtain coffee-based beverages able to supply, on each occasion, personalized coffee-based beverages in relation to the specific request of a user in a reproducible and precise manner, and in rapid time. The present invention also concerns a method to dispense liquid coffee using a dispensing machine of liquid coffee, and a management and command program implementing the dispensing method.

16 Claims, 7 Drawing Sheets

(56) References Cited

FOREIGN PATENT DOCUMENTS

WO 2016/034255 A1 3/2016
WO 2017/189628 A1 11/2017

* cited by examiner $$q_{eff} = W_2 \left\{ \sigma \left[ W_1 \cdot \left\{ \frac{p}{\omega} \right\} \right] \right\}$$

MACHINE TO DISPENSE COFFEE-BASED BEVERAGES, AND CORRESPONDING DISPENSING METHOD AND PROGRAM

CROSS-REFERENCE TO RELATED APPLICATIONS

This application is a 371 of PCT Application No. PCT/IT2018/050225 filed on Nov. 21, 2018, which claims priority to Italian Application No. 102017000133303 filed on Nov. 21, 2017, the contents of which are hereby incorporated by reference as if recited in their entirety.

FIELD OF THE INVENTION

Embodiments of the present invention concern a coffee-based beverage-dispensing machine able to provide, on each occasion, customized coffee-based beverages in relation to the specific requests of a user.

The present invention also concerns a method for dispensing coffee-based beverages, the latter referred to hereafter as a liquid coffee, used to supply the specific type of liquid coffee requested by a user.

Embodiments of the present invention also concern a program suitable to manage and control the liquid coffee dispensing machine in relation to the specific type and characteristic of the liquid coffee requested by a user.

BACKGROUND OF THE INVENTION

Liquid coffee dispensing machines exist which, by means of extraction, or the controlled percolation of hot water under pressure through a panel of coffee powder, dispense the type of coffee-based beverage required.

The machines are provided with a pump connected to a water supply source, able to remove water from the water supply source to convey it under pressure toward a heating device.

From the heating device, hot water and/or water vapor are obtained which, by means of the pump, are fed to an extraction chamber to obtain liquid coffee, by percolation through the coffee panel present in the extraction chamber.

Some known machines are provided with a control and command unit configured to drive the pump, the heating device, possible valves located upstream of the extraction chamber, pneumatic pistons to define the volume of the extraction chamber, or other components, in relation to the type of liquid coffee to be dispensed.

Known control and command units provide to detect a plurality of parameters by means of sensors installed along the path of the water, in the extraction chamber and downstream of the latter.

The parameters detected by the sensors are memorized in the control and command unit which compares them with predefined data.

Liquid coffee dispensing machines are known, able to dispense types of coffee in relation to the requests of a user which, however, include numerous problems that make them inefficient and inflexible.

Documents EP-B-1.802.222 (EP'222) and US-B-8.124.150 (US'150) describe a machine for dispensing beverages, for example coffee, which comprises a control and command unit able to detect and memorize at least the flow rate of the liquid coffee dispensed.

Hereafter we will refer to EP'222 but the considerations made on it can also be extended to US'150.

EP'222 is provided with an extraction chamber having a volume which can be defined in relation to the reciprocal desired position of two pistons.

The pistons require a high energy expenditure that weighs on the functioning of the other parts of the coffee-dispensing machine and makes it difficult to accurately define the pressure inside the extraction chamber, which is fundamental for obtaining different types of coffee with specific characteristics.

EP'222 provides that there is also a valve located upstream of the extraction chamber which does not allow to determine how long the water and/or the steam remains in the extraction chamber.

The known solution described by EP'222 also provides that the flow rate of the liquid coffee dispensed and exiting from the extraction chamber, and the temperature inside the extraction chamber, must necessarily be detected.

Furthermore, this known solution provides to adjust the parameters of the coffee machine in relation to what is detected downstream of the extraction chamber, or in relation to the dispensing flow rate of the liquid coffee, as the detection is deferred and consequently so is the adjustment.

Because of these limitations, the known solution described in EP'222 is not versatile or flexible, since it is not possible to obtain a wide variety of types of coffee having specific characteristics, for example of the type which also includes creamy coffee, or in which a desired quantity of air is incorporated.

This known approach is also slow and imprecise since the adjustment is made in delayed times both to memorize the data detected following the dispensing of the coffee, and also because the adjustment takes place after the real-time detection of the flow of the liquid coffee dispensed.

Another problem of this known solution is that the coffee dispensed before the flow rate has been detected, or in any case before adjustments of the parameters have been carried out, if the coffee has organoleptic characteristics such as taste, aroma, acidity, body, or other, which are different from those requested by the user, conditions in an uncontrollable way the organoleptic characteristics of the final product dispensed into the cup.

Coffee lovers or enthusiasts are able to detect variations in the organoleptic properties, even minimal, which can influence their judgment of the beverage and their choice or preference of a specific type of coffee or coffee producer.

The prior art documents EP-B-2.409.613 (EP'613) and US-B-8.960.077 (US'077) also describe machines for dispensing beverages, such as coffee for example, which have an extraction chamber with a volume that can be adjusted by two pistons.

In particular, the pistons are also used to define the height of the nozzle that dispenses the beverage. These solutions substantially have the same problems as EP'222; they also act on parameters, such as the height of the dispensing nozzle, which at times affect in an uncontrolled manner the organoleptic characteristics of the liquid coffee dispensed.

Furthermore, these solutions entail maintenance charges.

The prior art document EP-B-2.294.953 (EP'953) describes a coffee machine analogous to those described in the previous documents that we have commented on, which has two or more pumps located in series connected to the water tank.

In addition to the problems described above, all present, this known solution is even more wasteful from the energy point of view compared with the known solutions that we have commented on. Furthermore, it poses other problems of coordination and above all of maintenance.

The prior art document EP-B-2.001.343 (EP'343) describes a dispensing method and a coffee dispensing machine able to carry out a pre-infusion in the extraction chamber.

However, this known solution provides to interrupt the flow of water into the chamber for a defined time, even for many seconds.

The interruption of the flow of water is carried out by deactivating the main pump and/or by driving a valve located downstream of the pump itself.

This known solution is not only slow but is also wasteful from an energy point of view since the pump is driven several times to dispense a single coffee beverage.

This can cause an uncontrollable quantitative and qualitative imbalance of both the water used to obtain the beverage to be dispensed and also the beverage itself.

It also entails wear of the apparatuses and components, complexity in the management program and excessive stress on both mechanical, hydraulic and electronic components.

Furthermore, EP'343 provides that when the flow of water is interrupted, the quantity of residual water present along the pipes upstream of the extraction chamber is discharged into a collection container. This requires large spaces that make the dispensing machine bulky.

EP'343 also provides additional devices and greater complexity of the control and command system, which result in wear on the components, high energy consumption and problems of stagnation and contamination due to the water present in a collection container.

From document WO-A-2017/189628 a machine and a method for the production of infused beverages are also known.

More specifically, the machine comprises a solvent flow management system (SFMS), that is, a pump, a solvent temperature management system (STMS), that is, a heater, an infusion chamber, a solution/pressure management system for the solution/infusion (SPMS), and a control system used to monitor and/or modify automatically and independently the characteristic variables of the solvent, such as pressure, temperature and flow.

The machine also comprises sensors, such as thermocouples, pressure gauges and flow meters positioned through the machine that produces the beverages.

The control system can use one or more infusion algorithms to assist in controlling any one whatsoever of the SFMS, STMS and SPMS during an infusion. The solution/infusion pressure adjustment/management system (SPMS) selectively modulates the infusion pressure by adding a flow resistance generated by the valve.

The particular configuration of the machine described in WO-A-2017/189628, however, has high thermal and mechanical inertia which makes the machine particularly slow in responding to possible fluctuations with respect to optimal functioning conditions.

The control system of WO-A-2017/189628, in fact, is not able to take into consideration the instability of functioning, that is, the conditions of non-linearity, which are induced by driving each of the operating components of the machine. It should also be noted that the coffee dispensing process, during the dispensing interval, can last for a few dozen seconds.

There is therefore a need both to perfect a liquid coffee dispensing machine and also to perfect the dispensing method relating to a liquid coffee dispensing machine, as well as to perfect the management and control program for a liquid coffee dispensing machine.

The above improvements are intended to overcome at least one of the disadvantages of the state of the art.

One purpose of the present invention is to provide a machine for dispensing liquid coffee that can satisfy the requirements of dispensing the specific type of liquid coffee having the characteristics requested by the user.

Another purpose of the present invention is to provide a machine for dispensing liquid coffee that is flexible and allows to obtain with adequate repeatability, reliability and precision in a wide range of coffee types, the specific characteristics desired by the user in a precise and timely manner.

Another purpose is to provide a reliable machine, program and method which require little or no maintenance.

Another purpose of the present invention is to provide a machine for dispensing liquid coffee with limited energy consumption and which allows to dispense the desired type of coffee rapidly and with high precision in the specific desired characteristics.

Another purpose of the present invention is to provide a method for dispensing liquid coffee able to efficiently and quickly manage and command the parameters of the components of the machine for dispensing coffee, in order to obtain the desired coffee.

Another purpose of the present invention is to provide a method for dispensing liquid coffee able to manage and command the individual components as required and in a coordinated manner, preventing unwanted energy expenditure or heat dissipation.

Another purpose of the present invention is to provide a program able to manage and command a machine for dispensing liquid coffee able to implement the coffee dispensing procedures.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

Embodiments of the present invention concern a machine to dispense liquid coffee comprising a circuit provided with at least:

a pump configured to feed a controlled quantity of water under pressure, a heating device configured to heat the water supplied by the pump, an extraction chamber located downstream of the heating device and configured to contain a desired quantity of coffee powder, and a dispensing valve of the proportional type and selectively adjustable to control the dispensing flow of the liquid coffee exiting from the extraction chamber.

In accordance with one aspect of the invention, the machine comprises:

sensors configured to detect functioning parameters of the circuit, a user interface with which a user can select one of a plurality of liquid coffee recipes, and a memorization device to memorize a list of characteristic extraction curves of the liquid coffee, each associated with one of said recipes.

In accordance with possible solutions of the invention, the sensors are configured to detect, repeatedly during the dispensing time, at least one functioning parameter of the circuit.

Moreover, the machine comprises a control and command unit configured to implement:

a non-linear mathematical model with coupled variables, configured to mathematically describe the functioning of the circuit, a processing and filtering algorithm configured to receive the at least one functioning parameter detected by the sensor, and to determine, repeatedly during the dispensing time and on the basis of the mathematical model, a plurality of system variables suitable to describe the behavior of the circuit over time, a non-linear control algorithm configured to compare and identify, repeatedly during the dispensing time, a deviation between the system variables and the characteristic extraction curve selected and to supply, on exit, repeatedly during the dispensing time, command signals at least of the pump, the heating device and the dispensing valve.

The combination of the above technical characteristics allows to actively control, in a responsive and predictive manner, the coffee dispensing machine repeatedly, during each dispensing.

During the dispensing time interval and by means of said comparison between the system variables and the extraction curve selected by the user, the non-linear control algorithm is able to predict the development over time of the various system variables, even though they behave non-linearly. The non-linearity of the system variables can however be estimated using said non-linear mathematical model.

The control system described above allows, in fact, to take into consideration the steady state of high transience that is established during each extraction process due to the great disturbances and variability induced by the components, for example by the flow instabilities generated by the pump.

Moreover, the combination of the technical characteristics described above allows to carry out, during the dispensing interval, a plurality of micro-adjustments on the pump, heating device and adjustment valve, which allow the entire system not to deviate from the selected extraction curve, thanks to the evaluation of each deviation that is determined on each occasion.

The continuous iteration of information between the processing and filtering algorithm, the non-linear control algorithm and the non-linear mathematical model allows to define a control system which, advantageously, is able to implement self-learning logics.

For example, the self-learning logics can provide that the non-linear control algorithm is configured to modify, over time, even the non-linear mathematical model according to the system variables that are determined on each occasion.

Embodiments of the invention also concern a method to dispense liquid coffee through a circuit, which provides to:

feed a controlled quantity of water under pressure by means of a pump;

heat the water fed from the pump with a heating device;

position a desired quantity of coffee powder in an extraction chamber;

make the heated water pass from the pump through the extraction chamber;

adjust the dispensing flow of the liquid coffee exiting from the extraction chamber with a dispensing valve of the proportional type and selectively adjustable;

detect with sensors at least one functioning parameter of the circuit;

select one of a plurality of recipes for liquid coffee by means of a user interface;

memorize a characteristic extraction curve of the liquid coffee, each associated with one of the recipes, in a memorization device.

In accordance with one aspect of the invention, the sensors detect, repeatedly during the dispensing time, the at least one functioning parameter of the circuit.

Moreover, the method provides to:

receive the at least one functioning parameter and to determine with a processing and filtering algorithm, repeatedly during the dispensing time, a plurality of system variables suitable to describe the behavior of the circuit over time, said system variables also being determined on the basis at least of a non-linear mathematical model with coupled variables, configured to mathematically describe the functioning of the circuit, compare and identify, repeatedly during the dispensing time, with a non-linear control algorithm, a deviation between the system variables and the characteristic extraction curve selected, supply, on exit, repeatedly during the dispensing time, command signals at least of the pump, the heating device and the dispensing valve.

In accordance with possible embodiments, the dispensing machine according to any one of the embodiments described here can be used as an automatic preparation module for liquid coffee functionally connectable to a modular apparatus for the preparation of beverages.

In accordance with possible formulations the modular apparatus can correspond to one of the embodiments described in the application WO-A-2016/193223 filed by the Applicant, and the contents of which are integrated in the present application.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
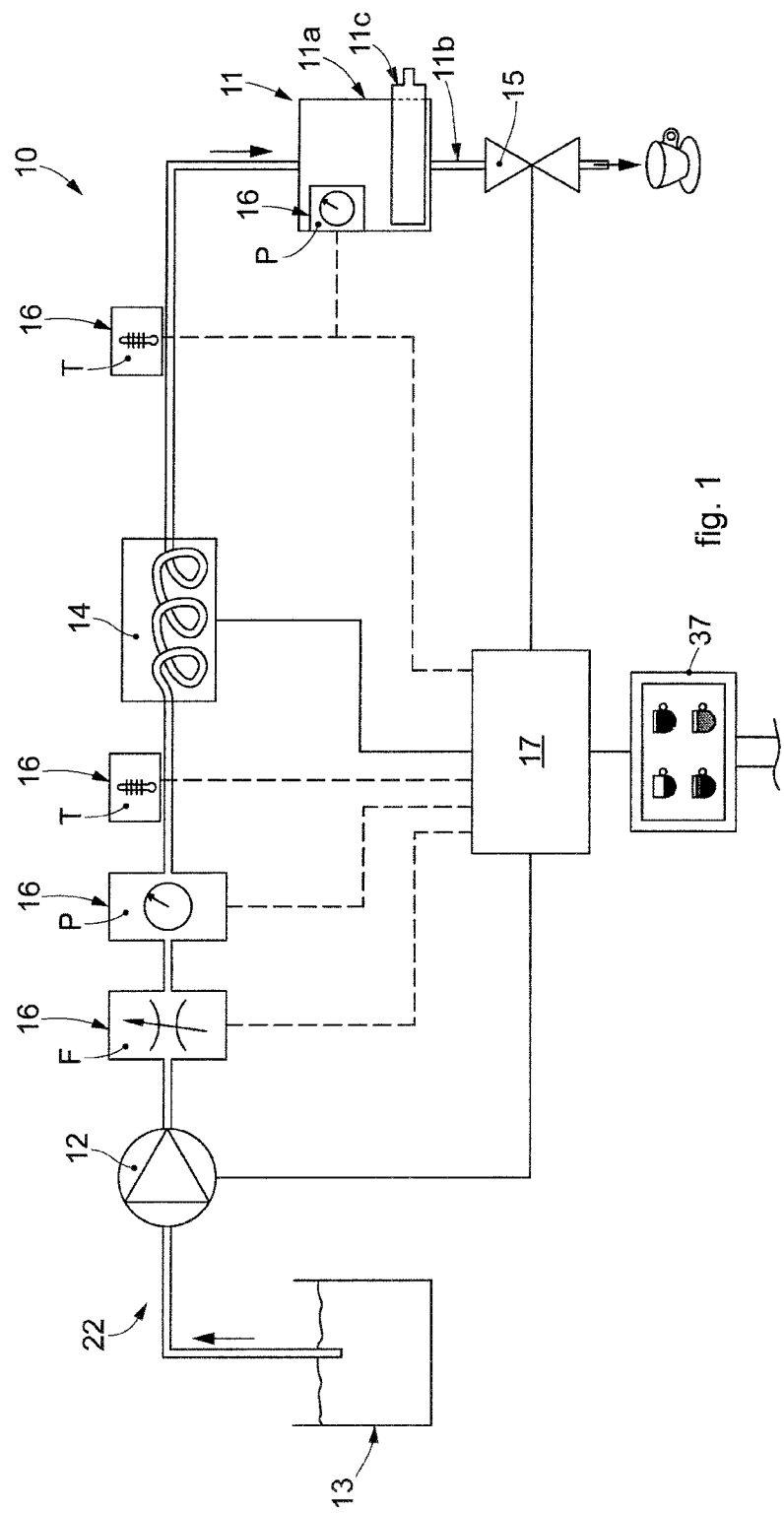
FIG. 1 is a schematic view of a machine to dispense liquid coffee according to a possible embodiment of the present invention.

Embodiments of the present invention concern a liquid coffee dispensing machine 10 able to dispense, with adequate repeatability, reliability and precision, a wide range of coffee types in the characteristics desired by the user in a precise and timely manner and in a short time.

Some embodiments provide that the machine 10 comprises a circuit 22 provided at least with a pump 12, a heating device 14, an extraction chamber 11 and a dispensing valve 15 connected to each other to dispense liquid coffee.

The machine 10 also comprises a control and command unit 17 configured to control the functioning at least of the pump 12, the heating device 14, and the dispensing valve 15.

The pump 12 is connected to a water supply source 13 and is able to remove and convey a desired quantity of pressurized water toward the extraction chamber 11.

According to possible embodiments, the pump 12 can be the positive displacement, syringe, lobe, peristaltic, geared or vibrating type, or combinations thereof. The pump 12 can be used to adjust the flow and pressure of the water removed from the water supply source 13.

According to a possible solution, the pump 12 can be the micro-gears type. This type of pump allows to control the flow of water supplied in a very precise manner, and has an extremely high response speed that allows to take into consideration the very unstable transients that occur during the dispensing of the liquid coffee.

According to an advantageous embodiment, the machine 10 comprises a single pump 12 able to remove the water from the water supply source 13.

According to possible solutions, the water supply source 13 can comprise a tank, or a mains supply, or a combination of both.

The heating device 14 is located between the pump 12 and the extraction chamber 11 and is configured to heat the water to the desired temperature.

In accordance with possible solutions, the heating device 14 is the rapid type, that is, it has a water heating time, to reach the desired temperature, of less than 3 seconds, preferably less than 2 seconds even more preferably less than 1 second. Furthermore, the heating device 14 can have a delay in the response that is less than or equal to one second.

According to possible embodiments, the heating device 14 is configured to heat the pressurized water arriving from the pump 12 as it passes through it. The transit of the pressurized water can be instantaneous, that is, about one second, or less.

The heating device 14 is able to vary and adjust the quantity of heat and the consequent temperature of the water heated in fractions of a second up to 100 Hz, preferably from 5 to 10 Hz, considering the thermal inertia of the system.

According to one embodiment of the invention, the heating device 14 can comprise at least one tubular pipe 29 made of an electrically and thermally conductive material and in which water is made to circulate during use. The tubular pipe 29 can be made of steel, for example AISI 304 or AISI 316 stainless steel.

The tubular pipe 29 can have a diameter comprised between 1.5 mm and 8 mm, preferably between 2 mm and 5 mm. The reduced sizes of the tubular pipe 29 allow to increase the speed of heating the water, obtaining an extremely rapid heating response.

The tubular pipe 29 can be provided with terminal ends 30 that can be selectively connected to an electric energy source. The terminal ends 30 can define respectively the positive pole and the negative pole of the electric power supply, which is made to circulate through the tubular pipe 29. The latter therefore behaves as an electric resistance, and when electrically powered it heats the water transiting through it.

According to one solution of the invention, the extraction chamber 11 consists of at least a fixed component 11a and a removable component 11c which can be temporarily combined with the fixed component 11a. At least one exit pipe 11b of the liquid coffee is present, to dispense the latter from the extraction chamber 11.

The removable component 11c is suitable to contain a desired quantity of coffee powder in the selected grain size.

According to possible solutions, the removable component 11c has a geometry and sizes able to define the volume of the extraction chamber 11 once the removable component 11c is temporarily combined with the fixed component 11a.

The removable component 11c can define a containing compartment 36 in which coffee powder can be inserted in the selected grain size.

The containing compartment 36 is located in fluid communication with the exit pipe 11b. The water fed by the pump 12 is fed into the containing compartment 36, passes through the coffee powder contained therein, and comes out through the exit pipe 11b.

According to possible embodiments, the exit pipe 11b can be integral with the removable component 11c, or fixed.

Once the removable component 11c has been coupled with the fixed component 11a, the extraction chamber 11 has a fixed volume.

Figure 2:
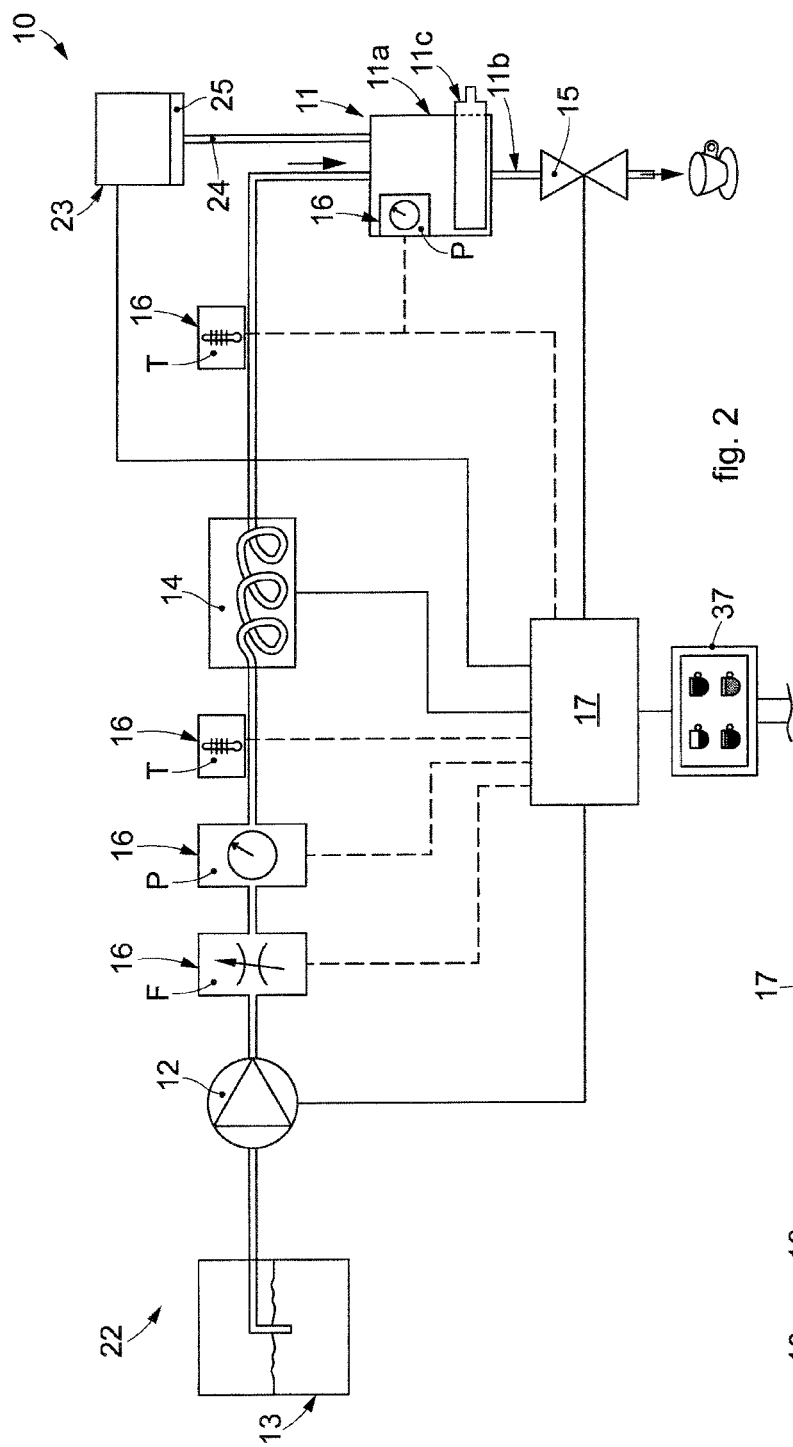
FIG. 2 is a schematic view of a machine to dispense liquid coffee according to a possible variant embodiment.

According to possible variant embodiments, described using FIG. 2, the extraction chamber 11 can be connected to a pneumatic system 23 by means of a pipe 24.

The pneumatic system 23 can comprise dispensing means 25 able to introduce into the extraction chamber 11a desired quantity of fluid, for example compressed air, nitrogen, carbon dioxide, or other gas arriving from a fluid supply source, not shown.

For example, the dispensing means 25 can comprise a selectively drivable valve to allow the introduction of the fluid, and possibly pumping devices.

The pneumatic system 23 is configured to put the extraction chamber 11 under pressure with the gas.

In accordance with this embodiment, the pressure in the extraction chamber 11 can be determined both with the water coming from the water supply source 13, and with the gas, and also using both.

For example, the use of compressed air, nitrogen, carbon dioxide, or other gas allows to incorporate air, or the gas itself, directly inside the coffee beverage being made.

Furthermore, once the beverage has been dispensed, the air, or the gas, allows to remove possible stagnant water and/or coffee residues present in the extraction chamber 11. This prevents possible contamination, for example of a bacterial nature.

According to possible embodiments, the pneumatic system 23 can be controlled and commanded by the control and command unit 17.

Figure 6:
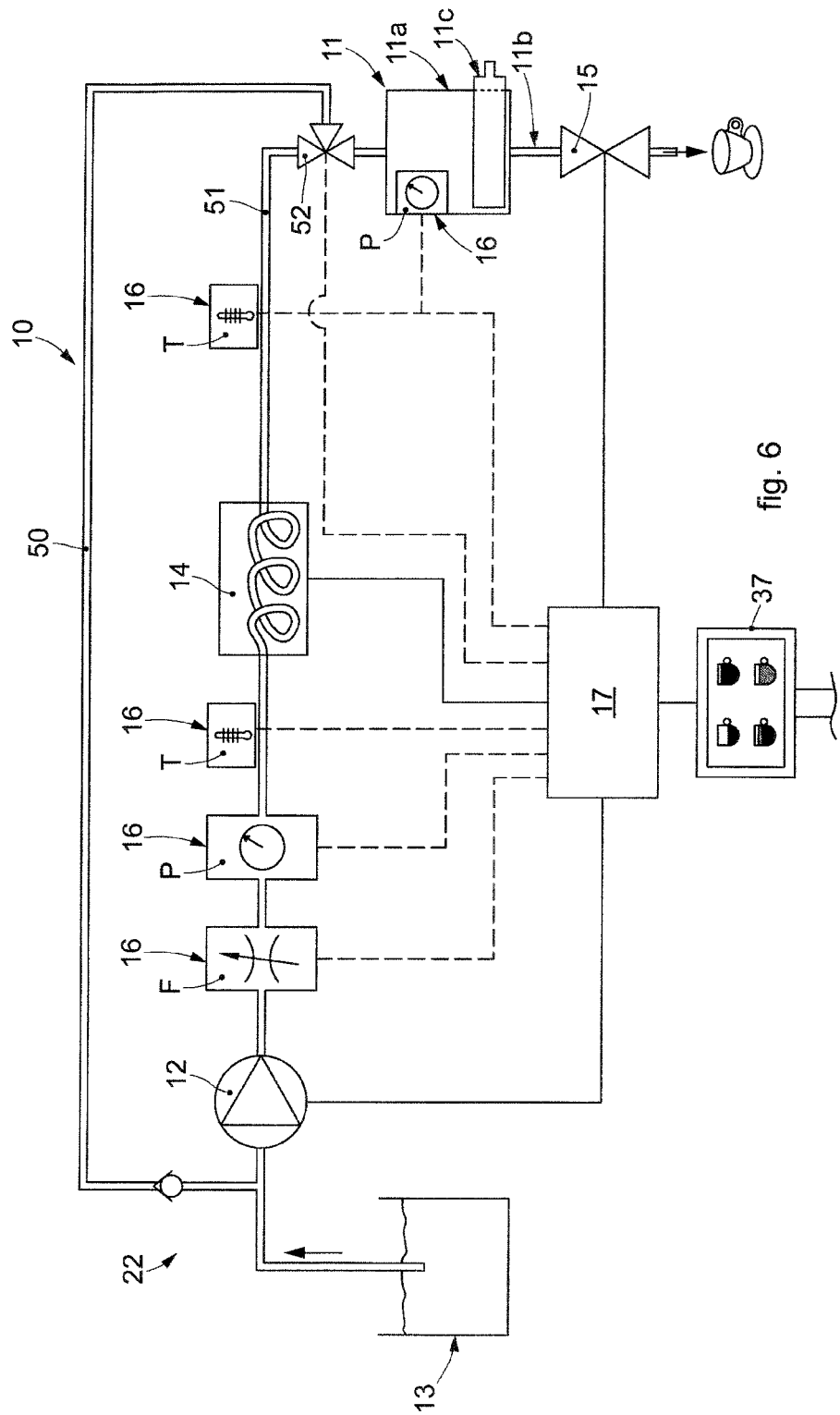
FIG. 6 is a variant of FIG. 1.
Figure 7:
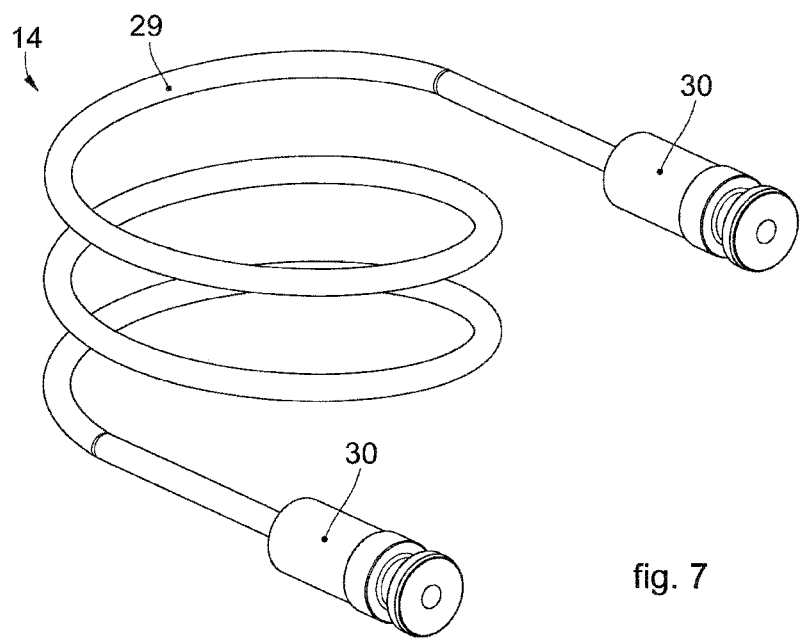
FIG. 7 is a component of the machine according to the invention.

In accordance with another variant embodiment (FIG. 6), the circuit 22 can comprise a by-pass pipe 50 interposed between the delivery pipe of the pump 12 and a connection pipe 51 provided between the heating device 14 and the extraction chamber 11.

The connection pipe 51 is provided with a distribution valve 52, for example the three-way type, in which the by-pass pipe 50 is connected.

The distribution valve 52 can be connected to the control and command unit 17, and be selectively commandable to intercept or allow flow through the by-pass pipe 50 and/or toward the extraction chamber 11.

In particular, it can be provided that when it is required to dispense the liquid coffee, the distribution valve 52 allows the water to pass through the connection pipe 51. On the contrary, when the water present in the connection pipe 51 is not in the desired conditions, for example, of temperature, the water is recirculated through the by-pass pipe 50, preventing it from being introduced into the extraction chamber 11.

The by-pass, moreover, can allow to recirculate the water toward the heating device 14 to rapidly reach the suitable temperature of the water even when the machine 10 itself is started cold.

According to possible embodiments, the exit pipe 11b can be combined with the dispensing valve 15.

The presence of the dispensing valve 15 in the exit pipe 11b allows to suitably control the conditions of the water, and in particular the pressure, in the extraction chamber 11.

The dispensing valve 15, in particular, can be installed in the exit pipe 11b, that is, to dispense the liquid coffee from the extraction chamber 11.

The dispensing valve 15 is the proportional type, that is, it allows to adjust the dispensing or transit section of the liquid coffee.

The size of the dispensing section is controlled and defined proportionally, on each occasion, by the control and command unit 17.

According to possible solutions, the dispensing section determined by the dispensing valve 15 and the pressure with which the beverage is pushed through the dispensing section itself are such as to generate a turbulent regime which associates air with the liquid coffee being dispensed.

Applicant has found that there are conditions in which the dispensing section and the action of the pump allow the liquid coffee to incorporate air and make it creamy. These conditions provide to establish a defined turbulence regime.

According to possible embodiments, the dispensing valve 15 can be incorporated, or integrated, into the removable component 11c and/or into the exit pipe 11b.

According to possible embodiments, the dispensing valve 15 can comprise a shutter having at least one truncated cone portion which can be positioned by an actuator, such as a servo motor, in order to adjust the dispensing section of the coffee from the extraction chamber 11.

In accordance with possible solutions, the dispensing valve 15 can comprise a shutter having at least one spherical portion which presses on a channel exiting from the extraction chamber 11 which can be moved in a controlled manner by driving, for example, a shape memory material associated with the shutter.

For example, the actuation can be the electric or magnetic type. In particular, in the case of shape memory material, the actuation can be obtained by means of an electric voltage acting on the shape memory material.

According to possible embodiments, the dispensing valve 15 can be a valve functioning with a pulse width modulation logic, or PWM. The dispensing valve can comprise an electro valve, a valve driven electromagnetically or magnetically, possibly in combination with an elastic element, with a double magnetic field, or of another type.

According to possible embodiments, the dispensing valve 15 is commanded to define the dispensing time of the coffee beverage through a fixed dispensing section. This solution can be commanded by means of a PWM logic.

This last solution allows to dispense the desired quantity of liquid coffee with high precision, and does not necessarily require working on the dispensing pipe to improve the surfaces thereof, such as electrodeposition of a coating layer.

Furthermore, this solution guarantees high dispensing accuracy for flow rates comprised within the range of flow rates of the present invention.

Another advantage of the solution which uses a dispensing valve 15 with PWM logic is that it is possible to correct the effects of load losses and/or variations in the geometry of the passage section on the dispensing of the coffee beverage.

For example, the geometry of the passage section can be altered by the presence of coffee residues on the shutter of the dispensing valve 15 and/or on the walls of the dispensing pipe.

According to possible embodiments, the dispensing valve 15 can comprise a channel for the interception/passage of the liquid coffee, that is, an entrance or exit pipe, coated with a material able to guarantee a surface tolerance of the predefined channel itself. For example, the material can be deposited in the channel by electro-deposition.

According to possible embodiments, the dispensing valve 15 can be made of a plastic material resistant to a temperature of less than or equal to about 150° C., preferably less than or equal to about 130° C.

According to possible solutions, the dispensing valve 15 is configured to manage and resist pressures comprised between 1.5 bar and 20 bar and flow rates comprised between 1 ml/s and 6 ml/s.

Figure 8:
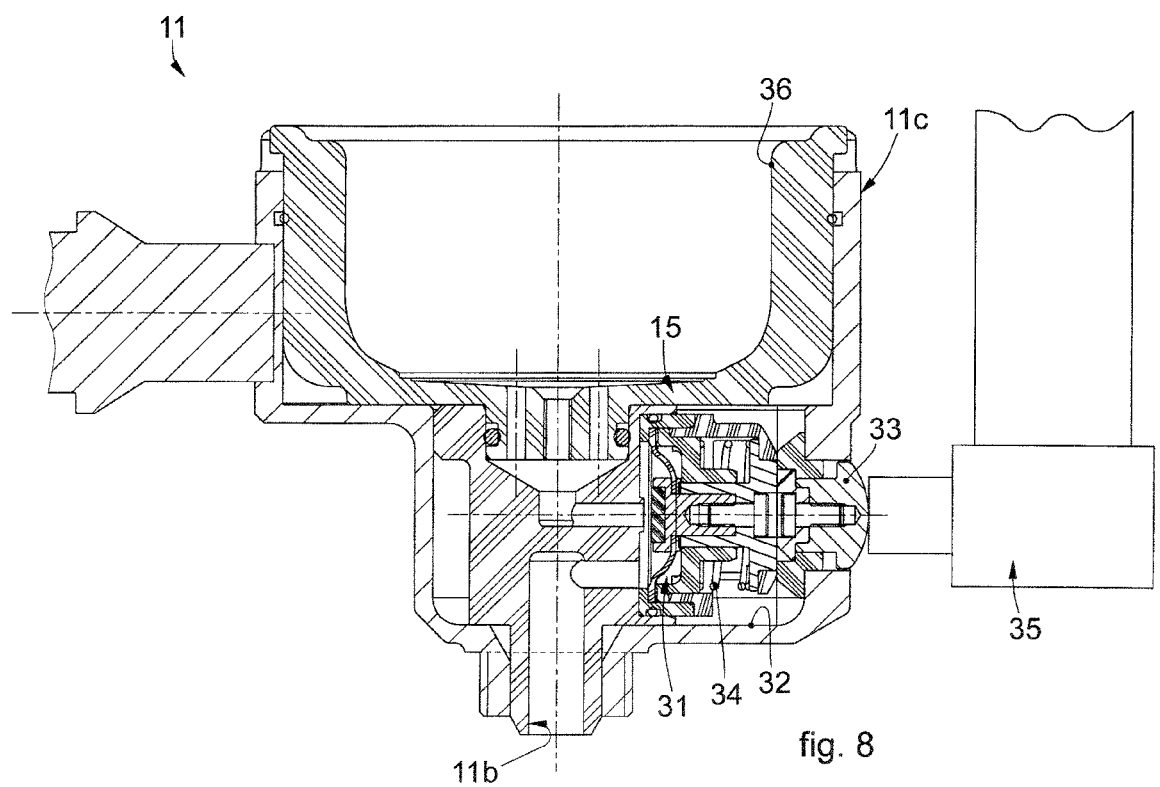
FIG. 8 is a section view of part of the machine in accordance with embodiments of the invention.
Figure 9:
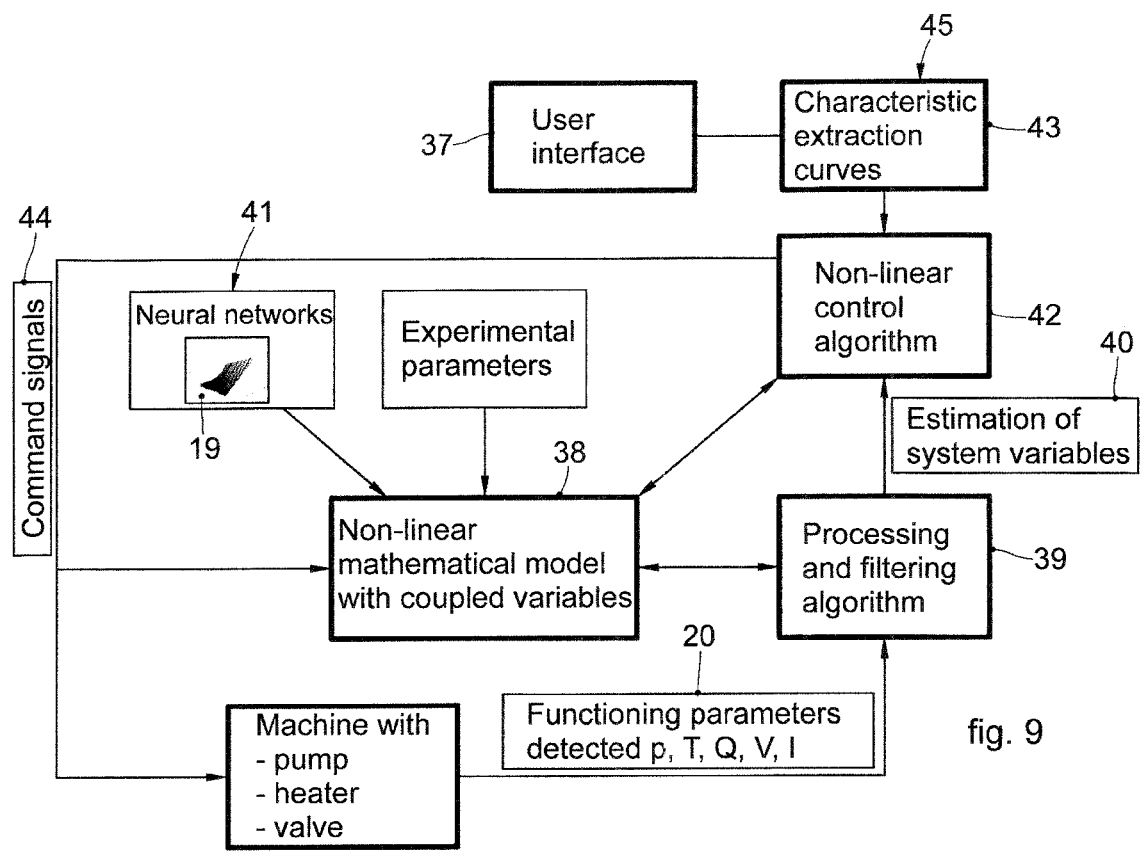
FIG. 9 is a schematic illustration of the control and command unit of the machine of the present invention.

In particular, it can be provided that the dispensing valve 15 is interposed along the extension of the exit pipe 11b (FIG. 8).

In accordance with possible solutions (FIG. 8), the dispensing valve 15 comprises a shutter 31 suitable to assume a first position, in which it closes or intercepts the exit pipe 11b, to condition the time the water remains in the extraction chamber 11, and at least a second controllable open position defining the dispensing section of the liquid coffee.

According to a possible solution, the removable component 11c can be provided with a housing seating 32 which intercepts, during use, the exit pipe 11b, and in which the shutter 31 is installed. The dispensing valve 15 can also comprise a slider 33 installed sliding in the housing seating 32 and connected to the shutter 31. The slider 33 can be selectively movable in a horizontal or substantially horizontal direction.

Between the slider 33 and the shutter 31 an elastic element 34 can be interposed, configured to keep the shutter 31 in a condition where it closes or opens the exit pipe 11b.

The dispensing valve 15 also comprises an actuator 35 configured to drive the shutter 31 and take it at least to said first and second positions.

The actuator 35 is connected to the control and command unit 17 to adjust the gap through which the water passes.

The actuator 35 can be the electromagnetic type. This type of actuation allows to obtain extremely reduced response times and extremely high precision in adjustment.

In accordance with a possible solution, the actuator 35 can be controlled in PWM.

According to a variant embodiment, the actuator 35 can be provided with a solenoid selectively drivable to determine the movement of the shutter 31.

The combination of an actuator 35 of the electromagnetic type with the presence of an elastic element 34 associated with the shutter 31 allows to reach in a very short time, also in the range of tenths of a second, a point of equilibrium that depends on the pressure in the extraction chamber 11.

The pressure in the extraction chamber 11 is, in fact, a function of both the flow rate entering into the extraction chamber 11, generated by the pump 12, and also of the force generated by the actuator 35.

By suitably controlling this condition of equilibrium between the action of the elastic element 34 and the actuator 35 it is possible to obtain a control of the exit flow rate of the liquid coffee from the extraction chamber 11.

The actuator 35 can be fixed with respect to the removable component 11c, which, during use, positions itself in cooperation with the actuator 35.

According to the present invention, the machine 10 also comprises sensors 16 connected to the circuit 22 and to its components and able to detect, in real time, a plurality of physical parameters, that is, functioning parameters of the circuit 22.

The sensors 16 can comprise at least one of either a temperature sensor T, a pressure sensor P or a flow meter F.

In accordance with possible solutions of the present invention, the sensors 16 can also be associated with at least one of either the pump 12, the heating device 14 or the dispensing valve 15 to detect their functioning parameters. By way of example only, it can be provided that the sensors 16 are configured to detect electric parameters, such as voltage, current, power, and functioning parameters of one and/or the other of the components of the circuit 22.

By way of example only, the sensors 16 can be configured to detect the electric voltage "V", or the supply current "I" that powers the pump 12, the heating device 14 and the dispensing valve 15.

According to possible solutions of the invention, the sensors 16 can be configured to detect at least one of either the flow rate, temperature and pressure, either directly or indirectly, for example by determining the electric functioning parameters of one or the other of the components of the circuit 22.

By way of example only, it can be provided that one of the sensors 16 is configured to detect the resistivity of the heating device 14 to consequently determine the temperature of the water.

According to possible embodiments, the sensors 16 consist of: two temperature sensors T, one of which is upstream and one downstream of the heating device 14, two pressure sensors P, one of which is located between the pump 12 and the heating device 14 and one located in the extraction chamber 11, and a flow meter F located downstream of the pump 12. In possible variant embodiments, the machine 10 can comprise only one, or a combination of two or more of the sensors 16.

In accordance with possible solutions, the sampling of the detections of the physical parameters detected by the sensors 16 is performed at a frequency comprised between 80 Hz and 120 Hz, preferably at 100 Hz.

According to other solutions of the invention, the flow meter F can be configured to detect the flow rate of water supplied by the pump 12 with a sampling frequency comprised between 20 Hz and 50 Hz, thus allowing to take into consideration the high instability of behavior of the pressure over time.

In accordance with another implementation of the invention, the temperature sensors T are configured to detect the temperature of the water passing through the circuit 22 with a frequency comprised between 5 Hz and 10 Hz. The sampling frequency values allow to take into consideration the thermal inertia of the different components of the machine.

According to possible advantageous embodiments, only a pressure sensor P is present in the extraction chamber 11.

This configuration of the sensors 16 is advantageous for adjusting the functioning parameters 20 of the machine 10 with high reproducibility, precision and speed, since it minimizes the number of sensors 16 needed which are used and which are located before the dispensing valve 15.

In accordance with a possible solution of the present invention, the machine 10 can comprise a user interface 37 with which a user can select one of a plurality of recipes for liquid coffee that he/she wishes to be dispensed.

By way of example only, the recipes can be related to the type of liquid coffee dispensed, for example espresso coffee, long, American, cold, and/or related to the type, or origin of coffee to be used.

A characteristic extraction curve 43 of the liquid coffee can be associated with each recipe.

The characteristic extraction curves 43 can identify the nominal functioning parameters of the machine 10 to obtain a liquid coffee with the desired properties.

The characteristic extraction curves 43 can identify the development over time of at least the pressure, temperature and flow rate of water which is introduced into the extraction chamber, for each instant of the time, or interval, of dispensing of the liquid coffee.

According to possible implementations of the invention, the machine 10 comprises a memorization device 45 configured to memorize at least a list of characteristic extraction curves of liquid coffee, each of which is associated with one of said recipes.

The control and command unit 17 is configured to implement a non-linear mathematical model 38 with coupled variables, configured to describe mathematically the functioning of the circuit 22, or at least of the pump 12, the heating device 14 and the dispensing valve 15.

In accordance with a possible implementation of the invention, the control and command unit 17 is configured to implement a processing and filtering algorithm 39 configured to receive at least one functioning parameter detected by the sensors 16, and to determine, repeatedly during the dispensing time and on the basis of at least the mathematical model, a plurality of system variables 40 which are suitable to describe the behavior, over time, of the circuit 22.

The system variables 40 can be independent, that is, measured, and/or set, for example as command signals, and dependent, that is, determined as a function of the independent system variables 40.

In particular, the functioning parameters detected by the sensors 16 can be processed with the processing and filtering algorithm 39 to determine the system variables and, consequently, to estimate the system states.

According to some solutions, the mathematical model 38 can comprise a plurality of first principle non-linear equations that govern the physical phenomena of the circuit 22 and which are used to determine the system variables.

In accordance with possible solutions, these first principle non-linear equations depend on a plurality of experimental parameters that allow to describe the behavior, possibly also correlated to each instant of a dispensing time interval, of each component of the circuit, in different functioning conditions. By way of example only, it can be provided that the experimental parameters are determined by numerical and experimental techniques.

In accordance with possible solutions, the experimental parameters can be detected by real measurements carried out on the circuit 22, for example by means of "gray-box modeling" techniques.

In accordance with possible solutions, the experimental parameters can comprise the construction and physical parameters of the components of the circuit 22, such as, by way of example only, the volume of the pump 12, the resistivity of the heating device 14, the sizes of the dispensing valve 15, the diameters of the connection pipes between the various components, the thermal/electric properties of each component.

In accordance with possible solutions, the mathematical model 38 can comprise, or implement, a plurality of correlation maps 19 configured to correlate, possibly at each time instant of the dispensing time, the system variables, also referred to as system states, the components of the circuit 22, or at least of the pump 12, the heating device 14 and the dispensing valve 15 so as to describe the behavior of each of these components. The correlation maps 19 can provide a correlation between the dependent and independent system variables 40.

The set of system variables defines a mapping of the circuit 22, that is, a plurality of correlation maps 19 for the functioning of at least one of either the pump 12, the heating device 14 or the dispensing valve 15, preferably of all three components.

Figure 11:
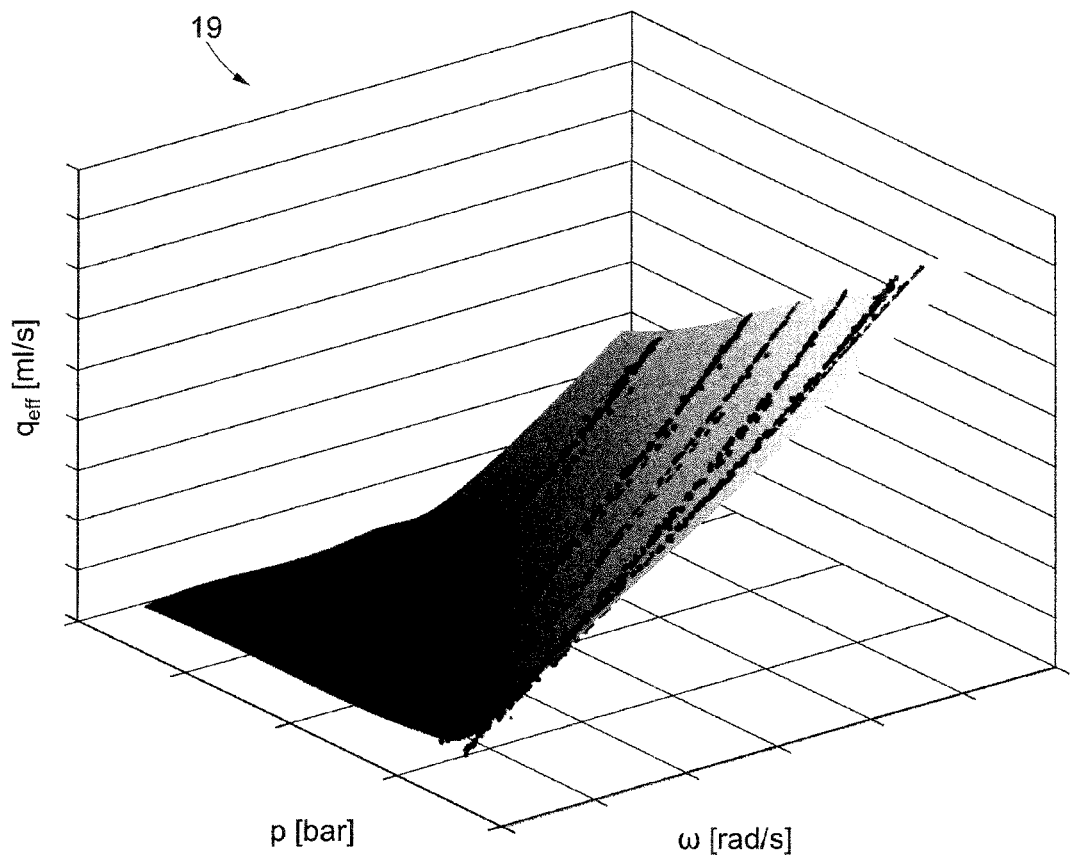
FIG. 11 is a schematic illustration of a correlation map.

With reference to FIG. 11, a possible correlation map 19 is shown of the functioning of the pump 12, in which correlations are identified between the rotation speed "w" of the pump 12, the pressure "p" and the flow rate "qeff" of water exiting from the pump 12.

The correlation map 19, shown in FIG. 11, identifies two independent variables, that is, the rotation speed and the pressure, and a dependent variable that is the flow rate, even if the correlation maps 19 are also applicable to spaces of arbitrary size, for example with more than two independent variables.

In general, moreover, with these system variables it is possible to describe mathematically all the non-linear characteristics present in the hydraulic/thermal circuit 22, or of their components.

According to one implementation of the invention, the mathematical model 38 is configured to implement neural networks 41 suitable to process the functioning parameters 20 detected and to determine said system variables 40.

The neural networks 41 can be implemented in the processing and filtering algorithm 39.

According to a possible solution (FIG. 12), the neural networks 41 are determined by a plurality of static parameters W1, also called weights.

The static parameters W1 are combined with each other by coupling functions σ defined by optimization algorithms to determine the system variables 40.

The coupling functions σ allow to make the system variable 40 to be determined converge, by using second weights W2, toward a single value.

In this way it is possible to obtain a sufficiently reliable estimate of the system variables 40 that are determined starting from the functioning parameters 20.

In accordance with a possible solution, the static parameters W1 of the system can be detected by means of off-line trials, or measurements, or offline training, in which a plurality of experimental data, detected on test benches, are processed by an offline optimization algorithm that converges on a set of parameters that minimize the error between real data and the outputs of the correlation maps.

The experimental parameters thus determined remain unchanged over time and become constants used by the control and command unit 17, in real time, to estimate and characterize the functioning of the circuit 22.

In accordance with another implementation of the invention, the system variables 40 can be determined by means of trials, or detections, performed directly, during use, of the machine, that is, on-line. The system variables 40 can be memorized during use of the machine 10 and processed by an optimization algorithm, also performed in real time, which allows to adapt the correlation maps 19 to the possible progressive change in the properties of the circuit 22, for example due to wear, damage, limescale formation, non-optimal functioning of the circuit components. This operating mode allows to implement automatic self-learning logics by the circuit 22, particularly as regards the hydraulic properties of the brick of coffee, which change during extraction, and from one extraction to another.

Figure 12:
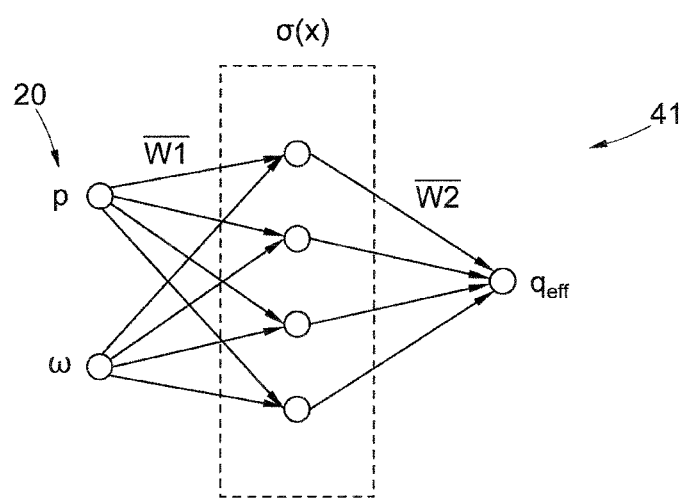
FIG. 12 is a schematic illustration of a possible neural network.

By way of example only, FIG. 12 shows, in a simplified manner, a possible neural network applied to the pump 12. In this specific case the neural network 41 is used to approximate the static link existing between the instantaneous rotation speed w of the pump 12, the instantaneous resistant pressure, and the actual instantaneous flow rate. The latter differs from the nominal flow rate, without recirculation, due to leakages from the delivery pipe to the suction pipe, and assumes a generally non-linear behavior.

The three-dimensional surface shown in the graph in FIG. 11 shows the output of the neural network, while the points show the actual measurements on the circuit 22. The three-dimensional surface is a precise mapping equivalent to the volumetric performance of the pump 12, that is, the ratio between the actual and nominal flow rate.

In general, the neural networks 41 can also be used in a similar way to describe mathematically all the non-linear characteristics of the hydraulic and thermal circuit.

In accordance with possible implementations of the invention, the processing and filtering algorithm 39 comprises one or more filters configured to filter disturbances and instabilities of the functioning parameters 20 detected by the sensors 16.

The functioning parameters 20 comprise a strong noise component which can also be further amplified by various factors.

The processing and filtering algorithm 39 allows, in fact, to detect only some functioning parameters 20, while the other parameters are estimated by determining the system variables 40.

The processing and filtering algorithm 39 therefore allows to reduce the total number of sensors 16 to a minimum number, so that the circuit remains observable.

In accordance with a possible implementation of the invention, the processing and filtering algorithm 39 can comprise an "Unscented Kalman Filter". By way of example only, the pressure signals represent a substantial noise component introduced for example by the conformation of the pump, for example by the gears, if the pump is the gear type.

These exciters, coupled with the dynamic behavior of the hydraulic chambers, are in some cases further amplified. Moreover, technically it is not always possible, nor economically advantageous, to measure all the variables that describe the behavior of the system. The Unscented Kalman Filter allows to filter the signals measured and, based on the non-linear mathematical model, to estimate the unmeasured states or variables. Therefore, the Unscented Kalman Filter allows to choose to use a subset of sensors to estimate all the states, provided that the system remains observable. With the Unscented Kalman Filter it is possible to monitor the parameters of the system so as to identify possible drifts over time to carry out the proper maintenance of the components.

In accordance with possible solutions, the control and command unit 17 is configured to implement a non-linear control algorithm 42 which is configured to compare and identify, repeatedly during the dispensing time, a deviation between the system variables 40 and the characteristic extraction curve 43 selected by the user.

Furthermore, the non-linear control algorithm 42 is configured to supply, at exit, repeatedly during the dispensing time, command signals 44 at least of the pump 12, the heating device 14 and the dispensing valve 15.

The command signals allow to implement instantaneous micro-corrections of the functioning of the circuit 22 so that the conditions which are established in the extraction chamber 11 are those defined by the characteristic extraction curves.

In accordance with possible solutions, the command signals 44 can comprise a drive parameter of the components of the circuit 22.

In possible solutions, the drive parameter can comprise an electric drive parameter for the pump 12, the heating device 14 and the dispensing valve 15.

By way of example only, the command signal 44 can comprise an electric voltage to power the pump, an electric voltage to power the heating device 14 and an electric voltage to drive the dispensing valve 15.

In accordance with a possible solution, the non-linear control algorithm 42 can comprise a model predictive control MPC of the adaptive type.

The command signals 44 are determined to make the system variables 40 perform the required trajectories defined by the characteristic extraction curves 43.

The non-linear control algorithm 42 allows to predict, instant by instant, the response of the circuit in the immediate future, based on the mathematical model 38, and calculates the optimal command signals 44 by means of an optimization procedure.

Figure 10:
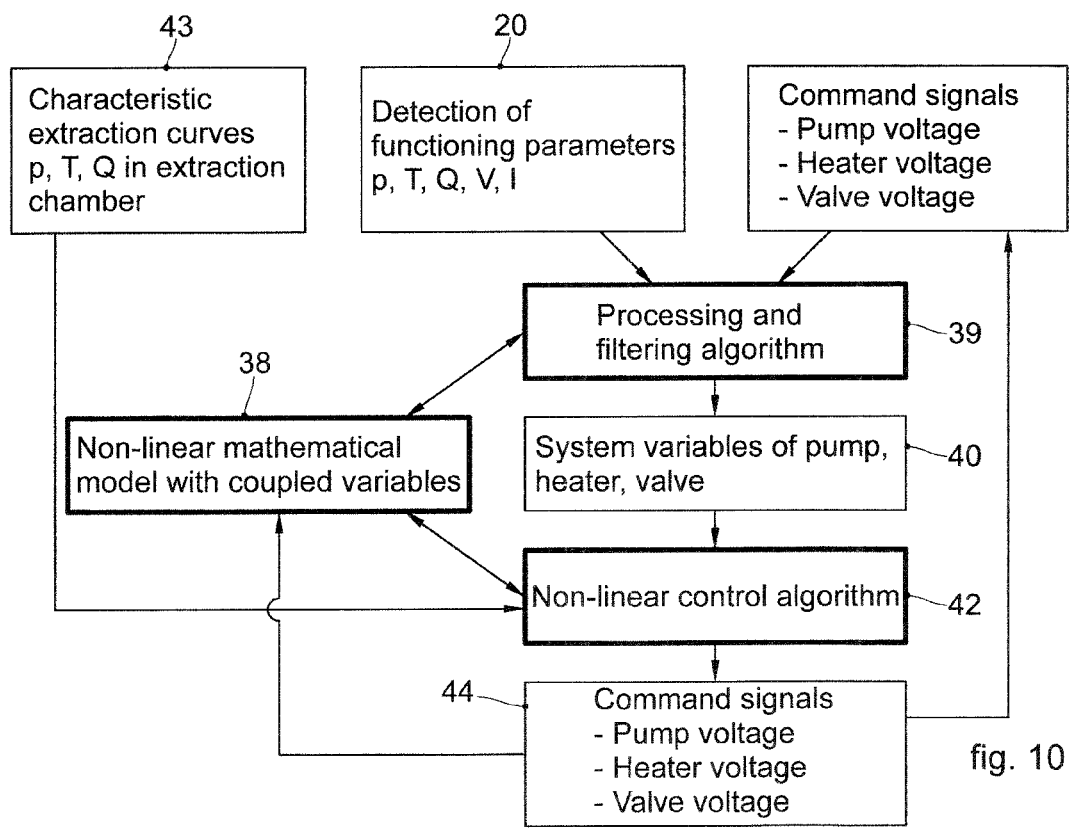
FIG. 10 is a diagram of the control dispensing flow of the liquid coffee.

With reference to FIG. 10 we will now describe a control flow, implemented by the control and command unit 17 on the circuit 22.

Initially, by means of the user interface 37, the user chooses the type of coffee required, or identifies a desired recipe for liquid coffee.

The control and command unit 17 receives this information from the user interface 37 and identifies a characteristic extraction curve for the specific recipe selected.

The control and command unit 17 starts the process of dispensing the liquid coffee by actuating the components of the circuit 22.

When these components are driven, the functioning parameters 20 at least of the pump 12, the heating device 14 and the dispensing valve 15 are detected.

In particular, values of pressure, temperature and flow rate along the circuit 22 can be detected, or electric parameters of voltage and/or current. Some of these functioning parameters 20 can be determined and/or estimated in an indirect manner, on the basis of other functioning parameters 20 detected directly.

Furthermore, at the start of the dispensing, command signals are set for the pump 12, the heating device 14 and the dispensing valve 15.

The command signals and the functioning parameters are processed by the processing and filtering algorithm 39, which also on the basis of the mathematical model 38 identifies the state of the system or all the system variables 40 which characterize at least the pump 12, the device heating 14 and the dispensing valve 15.

The non-linear control algorithm 42 compares the system variables 40 with the characteristic extraction curve selected by the user and identifies a deviation. The non-linear control algorithm 42, also on the basis of the mathematical model 38 and of the detected deviation, allows to identify command signals 44 for the pump 12, the heating device 14 and the dispensing valve 15.

The entire control flow is continuously repeated, several times during the dispensing process, supplying the command signals 44 as input at least to the processing and filtering algorithm 39. The latter combines the command signals with updated functioning parameters and repeats the control.

The command signals 44 determined on each occasion can also be supplied to the mathematical model 38 in order to update it.

The control logics described above allow to obtain a liquid coffee with the properties desired by the user, even if there are malfunctions of some components.

Moreover, the control and command unit 17 described above allows to obtain coffee beverages with optimal organoleptic characteristics even in extreme functioning conditions of the machine 10.

By way of example only, it can be provided to completely switch off the heating device 14, and therefore provide the extraction chamber 11 with water at source or room temperature, for example between 4° C. and 20° C., while still guaranteeing the extraction of a coffee beverage, so-called "cold-espresso".

In possible solutions, it can be provided that the temperature range of the water supplied to the extraction chamber 11 is comprised between 4° and 100° C.

According to a possible solution, the control and command unit 17 comprises basic instructions and means to process both the basic instructions and user instructions 18 supplied by a user, as well as the physical parameters, to provide specific instructions in real time to the dedicated components of the circuit.

The basic instructions can be memorized in the control and command unit 17, or made available to it by means of remote connections.

The basic instructions can comprise the start/stop functions of the machine, start of standby mode, the measurement and verification of the quantity of water present in the tank, the measurement and verification of the quantity of water supplied by the water source, or other functions normally provided in automatic liquid coffee dispensing machines.

According to another aspect of the present invention, the control and command unit 17 is configured to condition in real time, in a coordinated manner, and on each occasion, at least one of the functioning parameters 20 of at least one of either the pump 12, the heating device 14 or the dispensing valve 15.

Figure 5:
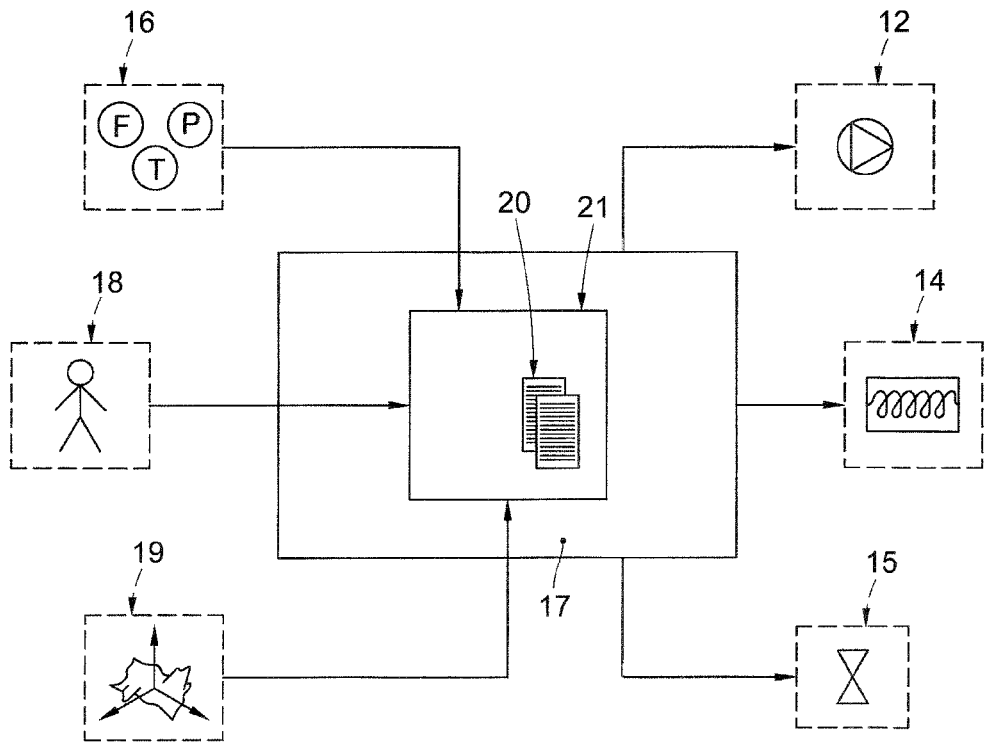
FIG. 5 is a schematic view that shows the functioning of a management and command program in relation to a dispensing machine of liquid coffee according to a possible embodiment.

According to possible advantageous solutions, the control unit 17 is suitable to process the physical parameters detected by the sensors 16 and the user instructions 18 in relation to at least one correlation map 19 (see FIG. 5) of the functioning parameters 20 memorized in the control and command unit 17.

According to one aspect of the present invention, the control and command unit 17 is configured to condition in real time, and in a coordinated manner, at least the functioning parameters 20 of the pump 12, the heating device 14 and the dispensing valve 15.

The adjustment is made in relation to the physical parameters detected by the sensors 16, to the user instructions 18 and at least one correlation map 19 of the functioning parameters 20 memorized in the control and command unit 17 itself.

More specifically, based on the correlation map 19 and the parameters detected by the sensors 16, the control and command unit 17 can condition, in a coordinated manner, the functioning of the various components, obtaining on each occasion types of liquid coffee otherwise not obtainable if these last elements were independently controlled.

Applicant has found that it is not necessary to detect the flow rate of the liquid coffee dispensed from the extraction chamber and that, instead, it is advantageous to adjust the time the water remains in the extraction chamber 11 by means of the dispensing valve 15.

Applicant has also found that it is advantageous, on many occasions, to condition the pressure in the extraction chamber 11 with the pump 12.

It has been observed that the coordinated action of the pump 12 with the dispensing valve 15 allows to obtain the desired flow rates and pressures of the liquid coffee exiting from the extraction chamber 11 and at the same time allows to obtain types of liquid coffee having desired characteristics, such as creaminess, body, etc.

The possibility of managing and controlling the functioning parameters of the dispensing valve 15 with the pump 12 in a coordinated manner, that is, by adapting the pressure and the dispensing section of the liquid coffee dispensed, also allows to obtain creamy coffees, or coffees similar to those obtainable with capsules and/or pods.

In particular, it has been found that it is possible to keep the pump 12 functioning and at the same time to open the dispensing valve 15 when the desired pressure is reached.

In relation to the water pressure and the section defined by the dispensing valve 15, it is possible to obtain the desired type of liquid coffee.

In this way it is possible to obtain types of liquid coffee typically obtained with capsules and/or pods without the need to dispose of the capsules, or the pods after use.

The user instructions 18 can be supplied remotely, or by means of a user interface connected to the control and command unit 17.

The control and command unit 17 is configured to implement a multi-input/multi-output control logic (MIMO), that is, it is able to condition a plurality of functioning parameters 20, while acquiring a plurality of physical parameters from the sensors 16 and in relation to the correlation map 19.

The correlation map 19 defines the functional development of one or more functioning parameters 20 in relation to one or more of the other functioning parameters 20 and/or of the physical parameters detected by the sensors 16. For example, the correlation map 19 defines a multi-variable correlation between two or more functioning parameters 20.

For example, a correlation map 19 comprises the cross functional developments of the power supply of the pump 12, the electric current that powers the heating device 14, the position of the shutter of the dispensing valve 15, the pressure in the extraction chamber 11, the flow of water downstream of the pump 12, and other specific functioning parameters 20 and/or physical parameters detected by the sensors 16.

Thanks to the correlation maps 19 memorized in the control and command unit 17, or accessible remotely from it, it is possible to coordinate the drive of the pump 12, the heating device 14 and the dispensing valve 15 so as to obtain, with each repetition, the specific liquid coffee having the desired characteristics.

The coordinated drive of the pump 12, the heating device 14 and the dispensing valve 15 allows to optimize, in real time, the functioning of the individual components of the circuit. The optimization can also operate on the energy consumption of the machine, acting in the functional zones of the correlation map that allow to minimize the energy used. Moreover, it can be provided that the heating device 14 can be commanded exclusively as needed and for short times, even less than one second.

This allows to save energy and not disperse heat without it being effectively used to heat the water needed to make liquid coffee.

According to possible embodiments, the correlation map 19 can comprise functional zones in which there is a high non-linearity of the functioning parameters 20.

These non-linear functional zones can be identified in real time by the control and command unit 17 in relation to the physical parameters detected by the sensors 16 and to the user instructions 18.

The control and command unit 17 can be configured to identify these functional zones and to prevent the components of the machine 10 from operating with these functioning parameters 20.

The control and command unit 17 can be configured to optimize and manage the components of the circuit 22 in the non-linear zones using specific algorithms and/or functioning procedures.

For example, the control and command unit 17 can be configured to approximate the functioning parameters 20 with linear developments.

In relation to this linear approximation, the control and command unit 17 can be configured to command the components of the circuit 22.

Thanks to the detailed knowledge of the functional developments of the components of the machine 10 provided by the correlation map 19, the control and command unit 17 can optimize energy consumption in real time.

The control and command unit 17 can be configured to identify the functioning parameters 20 which minimize the energy to be used to obtain the liquid coffee required by the user.

The identification of the functioning parameters 20 which minimize the energy can be performed by means of a program able to determine, in relation to the user instructions 18 and the physical parameters detected by the sensors 16, the energy associated with a set of functioning parameters 20.

From the comparison of the energies relating to a predefined number of sets of functioning parameters 20 in the neighborhood of those which allow to obtain the type of liquid coffee requested, it is possible to identify the set of functioning parameters 20 to which the minimum energy is associated.

The correlation maps 19 can also comprise information relating to the energies associated with a plurality of sets of functioning parameters 20 so as to speed up the identification of the functioning parameters 20 which minimize the energy consumed.

According to possible embodiments, the control and command unit 17 can be configured to control and command the heating device 14 in relation to the instantaneous state of the heating device 14 itself.

For example, the control and command unit 17 can implement a non-linear analytical model to obtain in real time the linearized model to be used for a non-linear temperature control.

According to possible embodiments, the control and command unit 17 can implement in the program that governs it an extended Kalman filter, an application of the Unscented Kalman Filter type to manage non-linearity, or other.

In accordance with possible solutions, keeping the pump 12 in operation, the dispensing valve 15 is configured to position the shutter at least in a closed position to condition the water and/or the steam to remain in the extraction chamber 11, and at least one open position, or partly open, defining a dispensing section through which the coffee is dispensed toward the exit pipe 11*b*.

The dispensing valve 15 allows to define the passage section of the liquid coffee in a proportional manner, that is, the control and command unit 17 adjusts the section in relation to the type of coffee to be dispensed and to the correlation maps 19.

In the closed position, the shutter of the dispensing valve 15 is able to define the time the water remains in the extraction chamber 11 in order to perform the desired pre-infusion.

In this condition, thanks to the coordinated action of the pump 12 with the extraction chamber 11, the latter can be saturated with water at a pressure defined by the pump 12 itself, according to the type of coffee to be dispensed.

The pump 12 and the dispensing valve 15 can be configured to simulate the conditions of an espresso capsule in the extraction chamber 11. Advantageously, the combined action of the pump 12 and the dispensing valve 15 can obtain the situation in which a counter-pressure is created, such as to define turbulence in the beverage and obtain a persistent cream.

These conditions are defined on the basis of the time the water remains in the extraction chamber 11 and the pressure reached inside it, which is maintained at a defined value, or continuously adjusted with a defined development, by means of the pump 12 commanded by the unit control and command 17.

After a set time, the shutter of the dispensing valve 15 is opened so as to define a dispensing section in a proportional manner. By acting on the pump 12 and on the aperture of the dispensing section defined by the dispensing valve 15 which can be fixed, or defined by a series of pulses, it is advantageously possible to generate turbulence which allows to incorporate air into the coffee so as to obtain a creamy beverage.

Typically, turbulence is generated due to the loss of load that occurs when the liquid coffee extract is thrust through the dispensing section.

In relation to the aperture adjusted by the position of the shutter of the dispensing valve 15, and the action of the pump 12, the flow rate of the liquid coffee dispensed is defined.

Therefore, the dispensing valve 15 is controlled by defining the flow rate of the liquid coffee dispensed and the time the water remains in the coffee panel in combination with the functioning mode of the pump 12.

Applicant has found that, advantageously, it could be unnecessary to directly monitor the flow rate of the liquid coffee dispensed with a specific sensor or in another way, as it can be sufficient to monitor the flow of water detected between the pump 12 and the heating device 14.

According to possible variants, not shown, the machine 10 can comprise a weighing unit located below the container in which the liquid coffee is dispensed and configured to weigh the container with the liquid coffee dispensed.

For example, the weighing unit can comprise a load cell. The weighing unit can be connected to the control and command unit 17 so as to allow the weighing unit to supply the control and command unit 17 with real-time information on the weight of the liquid coffee dispensed.

This can have the advantage of accelerating any adjustment of the functioning parameters 20 to obtain the specific type of liquid coffee having the characteristics requested by the user. In fact, thanks to the present invention it may not be necessary to wait for part of the liquid coffee to be dispensed in order to detect its flow rate.

In accordance with possible implementations of the invention, the weighing unit allows to perform a weighing operation, before the start of dispensing, at regular intervals during dispensing, for example every 100 ms, at the end of dispensing, and until the cup located on the weighing group is removed.

In this way, advantageously the liquid coffee dispensed is not altered in an uncontrolled way by a quantity of liquid coffee having characteristics different from those requested by the user.

The combined action of the pump 12 and the dispensing valve 15 allows to adjust flow and pressure by acting on two distinct points of the machine 10.

Based on the closing times of the dispensing valve 15, the pressure and flow defined by the pump 12 in combination with the load loss defined by the dispensing valve 15, it is possible to define, on each occasion, the specific conditions that allow to obtain a specific product in the cup.

Possible embodiments of the present invention concern a method for dispensing coffee-based beverages by means of a liquid coffee dispensing machine 10 as in one of the embodiments described.

According to the present invention, the dispensing method provides to:

supply to the control and command unit 17, in addition to the basic instructions, at least one correlation map 19 of the functioning parameters 20 relating to at least one pump 12, a heating device 14 and a dispensing valve 15, supply to the control and command unit 17 the user instructions 18 in relation to the type of liquid coffee to be dispensed;

detect physical parameters in real time along the circuit 22 by means of sensors 16;

condition in real time, and in a coordinated manner, one or more functioning parameters 20 of at least the pump 12, the heating device 14 and the dispensing valve 15, in relation to the physical parameters detected by the sensors 16, the user instructions 18 and the correlation map 19 supplied.

According to possible embodiments, the dispensing method can provide to keep the dispensing valve 15 in a closed position and simultaneously drive the pump 12 to define the pressure and the time the water remains in the extraction chamber 11.

In accordance with possible embodiments, the method provides to drive the dispensing valve 15 while keeping the pump 12 in operation to define a section for dispensing the liquid coffee from the dispensing valve 15.

According to possible embodiments, a fluid, such as compressed air, nitrogen, or other gas, can be injected into the extraction chamber 11.

The fluid can be introduced into the extraction chamber 11 even simultaneously with the water, and the pressure in the extraction chamber 11 is defined by the combined effect of both substances.

In accordance with possible solutions, the dispensing method provides to identify in real time and in relation to the user instructions 18, the physical parameters detected by the sensors 16 and the correlation map 19, the functioning parameters 20 which minimize the energy required to supply the type of liquid coffee required.

According to possible solutions, the dispensing method provides that the control and command unit 17 conditions the functioning of at least the pump 12, the heating device 14 and the dispensing valve 15 with the functioning parameters 20 that have been identified and are such as to minimize energy.

In accordance with possible solutions, the dispensing method provides to identify one or more functional zones of the correlation map 19, in which the functioning parameters 20 have non-linear functional developments.

If the functional zone or zones having non-linear developments of the functioning parameters 20 were to be identified, the dispensing method can provide to approximate the functioning parameters 20 in the non-linear zones with linear developments, in order to optimize and manage the components of the circuit 22.

According to possible solutions, the dispensing method provides that the control and command unit 17 does not drive at least the pump 12, the heating device 14 and the dispensing valve 15 with the functioning parameters 20 which have non-linear functional developments identified.

In accordance with possible formulations, the present invention also concerns a processor program 21 to manage and control a coffee dispensing machine 10 able to implement the dispensing method described.

In accordance with possible solutions, the management and control program 21 is able to identify in real time and in relation to the user instructions 18, the physical parameters detected by the sensors 16 and the correlation map 19, the functioning parameters 20 of at least the pump 12, the heating device 14 and the dispensing valve 15 which minimize the energy needed to dispense the type of coffee requested, said management and control program 21 being able to condition the control and command unit 17 to drive at least the pump 12, the heating device 14 and the dispensing valve 15 with the functioning parameters 20 identified.

According to possible embodiments, the management and command program 21 is configured to identify one or more functional zones of the correlation map 19, in which the functioning parameters 20 have non-linear functional developments.

The management and control program 21 can be configured to condition the control and command unit 17 not to drive at least the pump 12, the heating device 14 and the dispensing valve 15 with the functioning parameters 20 relating to these functional zones.

The management and control program 21 can be configured to condition the control and command unit 17 to drive at least the pump 12, the heating device 14 and the dispensing valve 15 with functioning parameters 20 which have non-linear functional developments and which are linearized.

It is clear that modifications and/or additions of parts can be made to the coffee dispensing machine 10, to the dispensing method, and to the management and control program 21 as described heretofore, without departing from the field and scope of the present invention.

Figure 3:
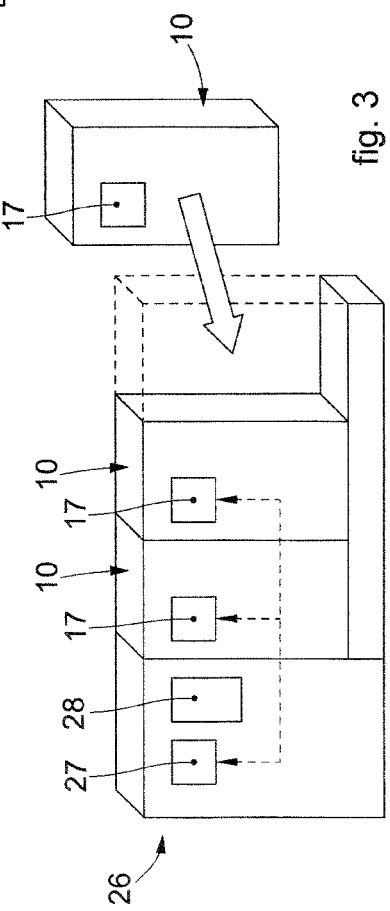
FIG. 3 is a perspective schematic view of a modular apparatus comprising dispensing machines used as modules.
Figure 4:
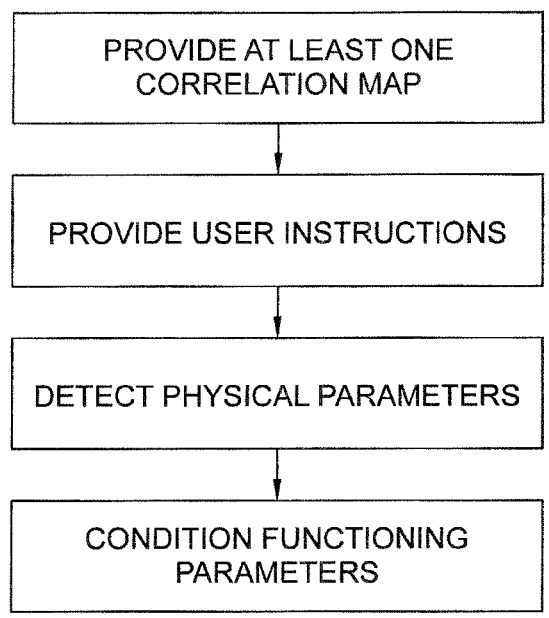
FIG. 4 is a block diagram of a dispensing method for liquid coffee according to a possible embodiment of the present invention.

In accordance with possible embodiments, the dispensing machine 10 can be used as module for the automatic preparation of liquid coffee that can be functionally connected in a removable manner to a modular apparatus 26 for the preparation of beverages (FIG. 3).

The individual automatic preparation modules are autonomous and allow the modular apparatus 26 to independently prepare also different beverages.

The modular apparatus 26 is configured to function even when one or more automatic preparation modules are not installed.

If the dispensing machine 10 according to the present invention is used as an automatic preparation module, the control and command unit 17 manages the functioning of the individual dispensing machine 10.

According to possible embodiments, the modular apparatus 26 can comprise a global control and management unit 27 configured to manage the functioning of the individual modules connected to the modular apparatus 26 in the same way as the individual control and command units 17.

According to possible embodiments, the modular apparatus 26 can comprise a unit to supply hot water and/or steam 28.

It is also clear that, although the present invention has been described with reference to some specific examples, a person of skill in the art shall certainly be able to achieve many other equivalent forms of coffee dispensing machine 10, dispensing method, and management and control program 21, having the characteristics as set forth in the claims and hence all coming within the field of protection defined thereby.

The invention claimed is:

1. Machine to dispense liquid coffee comprising a circuit provided with at least: a pump configured to feed a controlled quantity of water under pressure, a heating device configured to heat the water supplied by said pump, an extraction chamber located downstream of said heating device and configured to contain a desired quantity of coffee powder, and a dispensing valve of the proportional type and selectively adjustable to control the dispensing flow of said liquid coffee exiting from said extraction chamber, and wherein said machine comprises sensors configured to detect at least one functioning parameter of said circuit, a user interface with which a user can select one of a plurality of liquid coffee recipes, and a memorization device to memorize a list of characteristic extraction curves of the liquid coffee, each associated with one of said recipes, wherein said sensors are configured to detect, repeatedly during the dispensing time, said at least one functioning parameter of said circuit, and wherein said machine comprises a control and command unit configured to implement:

a non-linear mathematical model with coupled variables, configured to mathematically describe the functioning of said circuit, a processing and filtering algorithm configured to receive said at least one functioning parameter detected by said sensor, and to determine, repeatedly during the dispensing time and on the basis of said mathematical model, a plurality of system variables suitable to describe the behavior of said circuit over time, a non-linear control algorithm configured to compare and identify, repeatedly during the dispensing time, a deviation between said system variables and said characteristic extraction curve selected and to supply, on exit, repeatedly during the dispensing time, command signals at least of said pump, said heating device and said dispensing valve.

2. Machine as in claim 1, wherein said mathematical model is configured to implement neural networks suitable to process said functioning parameters detected and to determine said system variables.

3. Machine as in claim 1, wherein said mathematical model comprises a plurality of non-linear first principle equations that govern the physical phenomena of the circuit and that are used to determine said system variables.

4. Machine as in claim 1, wherein said mathematical model comprises, or implements, a plurality of correlation maps configured to correlate said system variables with respect to each other.

5. Machine as in claim 1, wherein said processing and filtering algorithm comprises one or more filters configured to filter the disturbances and instabilities of the functioning parameters detected by the sensors.

6. Machine as in claim 1, wherein the processing and filtering algorithm comprises an "Unscented Kalman Filter".

7. Machine as in claim 1, wherein said non-linear control algorithm can comprise a model predictive control of the adaptive type.

8. Machine as in claim 1, wherein said pump is of the micro-gear type.

9. Machine as in claim 1, wherein said heating device is the rapid type, and is configured to have a time to heat the water, in order to reach a desired temperature, of less than 3 seconds.

10. Machine as in claim 9, wherein said heating device is configured to have a time to heat the water, in order to reach a desired temperature, of less than 2 seconds.

11. Machine as in claim 1, wherein said dispensing valve is a valve functioning with a pulse width modulation logic (PWM).

12. Machine as in claim 1, wherein said dispensing valve is an electromagnetically driven valve.

13. Method to dispense liquid coffee through a circuit, comprising:
feeding a controlled quantity of water under pressure by means of a pump;
heating the water fed from said pump with a heating device;
positioning a desired quantity of coffee powder in an extraction chamber;
making the heated water pass from said pump through said extraction chambers;
adjusting the dispensing flow of said liquid coffee exiting from said extraction chamber with a dispensing valve of the proportional type and selectively adjustable;
detecting with sensors at least one functioning parameter of said circuit;
selecting one of a plurality of recipes for liquid coffee by means of a user interface, to memorize a list of characteristic extraction curves of the liquid coffee, each associated with one of said recipes, in a memorization device, wherein said sensors detect, repeatedly during the dispensing time, said at least one functioning parameter of said circuit, and wherein said method further comprising:
receiving said at least one functioning parameter and determining with a processing and filtering algorithm, repeatedly during the dispensing time, a plurality of system variables suitable to describe the behavior of said circuit over time, said system variables also being determined on the basis at least of a non-linear mathematical model with coupled variables, configured to mathematically describe the functioning of said circuit,
comparing and identifying, repeatedly during the dispensing time, with a non-linear control algorithm, a deviation between said system variables and said characteristic extraction curve selected,
supplying, on exit, repeatedly during the dispensing time, command signals at least of said pump, said heating device and said dispensing valve.

14. Method as in claim 13, wherein said command signals are supplied at entrance to said mathematical model.

15. Method as in claim 12, wherein said functioning parameter comprises the flow rate of water supplied by the pump and wherein said flow rate is detected by said sensors with a sampling frequency comprised between 20Hz and 50Hz.

16. Method as in claim 12, wherein said functioning parameter comprises the temperature of the water in transit in the circuit, and wherein said flow rate is detected by said sensors with a sampling frequency comprised between 5Hz and 10Hz.

* * * * *